Sept. 11, 1951     F. F. GRIFFITHS     2,567,430
PISTON POSITION INDICATOR
Filed Feb. 3, 1945
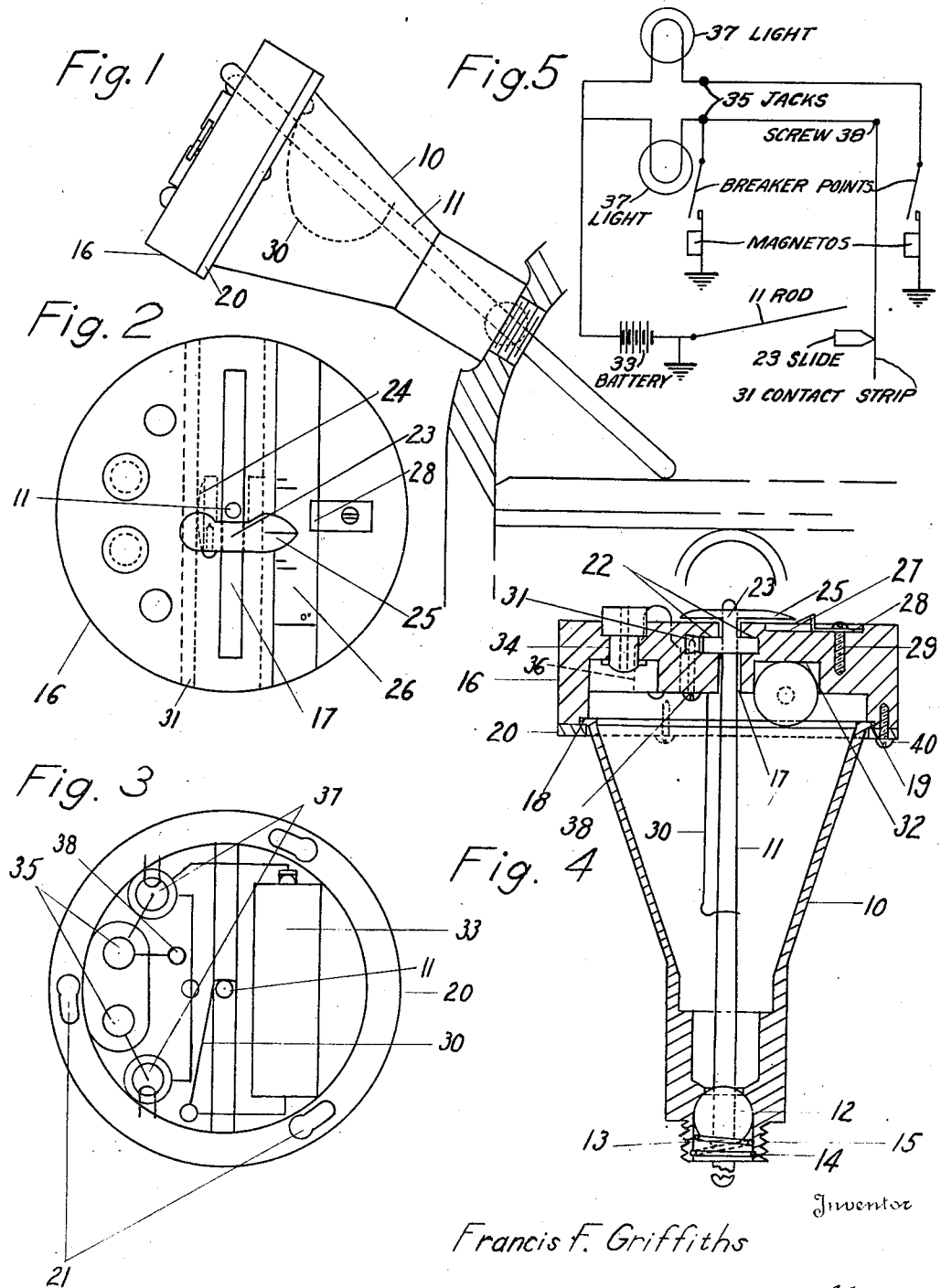

Patented Sept. 11, 1951

2,567,430

UNITED STATES PATENT OFFICE 2,567,430

PISTON POSITION INDICATOR

Francis F. Griffiths, Wethersfield, Conn.

Application February 3, 1945, Serial No. 576,085

8 Claims. (Cl. 116—124)

The present invention relates to devices for determination of the relative position of a piston in a cylinder and more particularly to a device for use in the timing of internal combustion engines.

The usual methods for the timing of internal combustion engines involve the use of several tools and several different steps to determine the position of the pistons at which it is desired that the breaker points in the magneto should open. The present invention makes possible the accurate timing of an internal combustion engine while at the same time eliminating several steps which have previously been found necessary for such a determination.

An object of the present invention is, therefore, to provide an improved device for determining piston position which will be simple in construction, inexpensive to manufacture, and with which timing of such an engine can be accomplished with increased accuracy, speed, and simplicity.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings:

Figure 1 represents a plan view of the device inserted in a cylinder head shown in cross section;

Fig. 2 is a top plan view of the cap member;

Fig. 3 is a diagram view of the wiring of the device and the cap-member retaining ring;

Fig. 4 is a sectional side view of the complete device; and, Fig. 5 is a circuit diagram.

My improved device comprises generally a supporting structure arranged to be secured to a cylinder of an engine; a rod mounted for movement in the supporting structure and adapted to extend into the cylinder and arranged to be moved by the piston of the cylinder when the latter approaches the top of its stroke; an indicator slide mounted on the supporting structure for adjustable movement thereon and adapted to be engaged by said rod and positioned thereby; and a scale member mounted for manual adjustment on said supporting structure in a line parallel to the line of movement of said indicator slide and having a calibrated scale on which the position of said indicator slide is indicated.

In the present illustrative disclosure where the device is shown as being an at angle to the line of movement of the piston, the supporting structure is shown as having a body portion and a head or cap rotatably adjustable thereon, and the operating rod is mounted for universal movement in the body member and is guided in its movement by the walls of a slot in the head member.

Referring to the drawings, the device shown comprises a supporting member 10 in the form of a hollow conical shell through which extends operating rod 11. Rod 11 is mounted for universal movement having a ball 12 which rests in a socket in the base of supporting member 10 and is held in place in its socket by a spring 13 which is maintained in position at its lower end by fitting into groove 14. Member 10 is provided with threads 15 in the outside of the lower end thereof to permit the device to be screwed into the spark-plug holes in an internal combustion engine.

Capping member 10 is a cap member 16 in which is a diametrically-disposed slot 17 for guiding the upper end of rod 11. Cap member 16 is supported for rotative adjustment on member 10 by providing circumferential flange 18 at the upper end of supporting member 10, said flange fitting in a groove 19 in the underside of cap member 16. A ring 20, supplied with key holes 21 for ease of disassembly, fits against the bottom edge of cap member 16 overlapping flange 18 and is held in position by screws 40.

Below the top of cap member 16 and at either side of slot 17 are disposed grooves 22 to provide a guideway for indicator slide 23. Indicator slide 23 has a small leaf spring 24 which presses against the side of one of the grooves 22 and serves to hold indicator slide 23 in position along the guideway and also serves as an electrical contact means as hereinafter described. Indicator slide 23 is also provided with an arm 25 extending over the adjacent edge of a calibrated slidable scale 26 lying in a groove 27, said groove being parallel to slot 17. The calibrated scale 26 is maintained in groove 27 by means of a tab 28 held in place by a screw 29.

A wire spring 30, extending from the bottom of cap member 16 and hooking over rod 11 above the point of pivot, urges rod 11 toward one end of slot 17 in order to return the rod towards said end of slot 17 when the piston engaging the lower end of rod 11 goes into its downward or power stroke.

Along the same edge of groove 22 as leaf spring 24 and engaged by said leaf spring is a metal contact strip 31. In cap member 16 is a cavity 32 in which rests a battery 33. Also in cap member 16 are light bulb holes 36 containing light bulbs 37, two bulbs being illustrated for use in a dual magneto make-break test as later described. Battery 33 is held in place at one end by suitable means such as a coil spring and said means is connected to wire spring 30. At its other end battery 33 is held by the pressure of suitable means such as a leaf spring, said means being connected to each of bulbs 37. For use in the piston position test hereinafter described, one of the bulbs is connected to metal contact strip 31 by means such as screw 38.

At the top of the stroke of a piston of an internal combustion engine there is a period, generally different for each type of engine, when the piston remains stationary during a few degrees turn of the crankshaft. This is called the "flat spot" and covers for each type of engine the same number of degrees turn of the crankshaft. The mid-point of this flat spot is called the "top dead center" position of the piston. In adjusting breaker points in the engine to open at a predetermined number of degrees from top dead center the position thereof must be measured by measuring the true center of the flat spot. This is generally accomplished by markings on the hub-plate of the propeller of an aircraft engine or on the flywheel of an automobile engine or the like. The present device eliminates the necessity of such markings. This is accomplished by calibrating scale 26 to allow for this flat spot in the type of engine being tested. The calibrations on scale 26, therefore, correspond, with adjustment to allow for the flat spot, to the number of degrees rotation of a particular engine for a corresponding movement of the upper end of rod 11 along slot 17 as said upper end is forced downward in the slot by the piston pressure against the lower end of rod 11.

Operation of the device is accomplished by first screwing member 10 firmly into the spark-plug hole of a cylinder in the engine to be adjusted. Cap member 16 is then turned so that slot 17 is approximately in the plane of the axis of the piston in the cylinder, the ball-joint permitting rod 11 to turn with cap member 16.

Indicator slide 23 is then pushed close to rod 11, and the engine turned in the direction of rotation. The piston on its upward or compression stroke will push against the lower end of rod 11, and, since rod 11 is ball-jointed, the upper end of rod 11 will move along slot 17, pushing indicator slide 23 with it. As soon as rod 11 touches indicator slide 23 a circuit will be completed through rod 11, indicator slide 23, leaf spring 24, contact strip 31, screw 38, bulb 37, and one end of battery 33, the other end of battery 33 being connected with wire spring 30 and hence rod 11. Bulb 37 will, therefore, be lit. When the piston of the engine begins its downward or power stroke, rod 11 will be forced back along slot 17 by wire spring 30, breaking the circuit by breaking contact with indicator slide 23. Hence, the light will go out. The engine is rotated until the upper end of rod 11 is returned by spring 30 to the end of slot 17. Then the 0° mark on calibrated scale 26 is aligned with indicator arm 25 on indicator slide 23. Slide 23 is then moved to the point where indicator arm 25 is aligned on calibrated scale 26 with the desired degree mark at which the adjustment is to be made. Now the engine is again turned in the direction of rotation, and the piston on its return stroke again pushes against the lower end of rod 11, moving the upper end of rod 11 along slot 17 as before. When the piston reaches the point at which the breaker points are to be adjusted to open, the rod will touch slide 23, forming a circuit as before, and lighting bulb 37.

It is obvious from the aforegoing description that the proper piston position could be determined without the use of the light signal system. This may be accomplished after positioning indicator slide 23 in its position at the top of the piston stroke as before mentioned and then, after referencing calibrated scale 26 at 0°, pushing indicator slide 23 back along slot 17 beyond the desired calibration mark on calibrated scale 26. When the piston again moves on its upward or compression stroke, rod 11 will move indicator slide 23 back along slot 17. The point at which arm 25 of said slide reaches the desired calibration mark will be the piston position desired.

In view of the fact that it is often difficult to determine by eye the exact make and break point of the breaker points in a magneto, I have also included in my device, for convenience, a signalling means for determining the proper point of adjustment of the breaker points. To this end, I have provided jack plug holes 34 in cap member 16 in which are inserted jack plugs 35, each jack plug being connected to a bulb 37. Two jack plugs and two bulbs have been provided to take care of an engine employing a dual magneto system, in which case a separate jack plug and bulb can be used for each individual magneto, indicated by the letter M in Fig. 5. By plugging leads into jackplugs 35 and connecting these leads to the magneto ground wire of each of the magnetos in a dual magneto system or by using only one jackplug and its adjacent bulb in engines having a single magneto, each of bulbs 37 will be in series with the battery 33 and one set of breaker points. The primary coil is then disconnected. Now, when the breaker points of the magneto are closed, a circuit will be completed through one end of the battery, the wire spring 30, the rod 11, the engine, the magneto, the jackplug, the light, and the other end of the battery, and the light will be lit. When said breaker points are open, the light will go out. This will enable an accurate indication of the breaker point opening to be obtained. In the case of a dual magneto system each of the magnetos M is adjusted in the same way using the individual lights and plugs provided. It is to be understood that, during a magneto adjustment, the rod acts only as a ground for the battery and the indicator slide is kept out of contact with the rod so that no circuit to the bulb through the slide will exist. During a piston position test, on the other hand, the jack plugs are not connected with the magneto or magnetos and do not, therefore, enter into the piston position test at all.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a device of the character described, a supporting structure having means for connecting the same to an engine cylinder, an operating rod carried by said supporting structure for movement relative thereto and extending therebeyond for engagement by a piston within said cylinder, an indicator slide mounted for adjustable movement on said supporting structure and adapted to be engaged and to be moved into a position by said rod indicating maximum movement of the rod relative to the supporting structure, and a scale member slidably adjustable independently of said slide along a line parallel to the line of movement of said indicator slide and having a calibrated scale with which said slide cooperates.

2. In a device of the character described, a supporting structure having means for connecting the same to an engine cylinder, an operating rod pivotally carried by said supporting structure for movement relative thereto and extending therebeyond so as to be engaged by a piston within said cylinder, said supporting structure having a slot through which said rod extends, an indicator slide slidably mounted along said slot for adjustable movement on said supporting structure and adapted to be engaged and to be moved into a position by said rod indicating maximum movement of the rod relative to the supporting structure, and a scale member slidably adjustable independently of said slide along a line parallel to the line of movement of said slide and having a calibrated scale with which said slide cooperates.

3. In a device of the character described, a member having means for connecting the same to an engine cylinder, a rotatably adjustable head carried on said member and having a slot, an operating rod carried by said member for universal movement relative thereto and having one end extending therebeyond so as to be engaged by a piston within said cylinder, the other end of said rod extending through said slot, an indicator slide mounted on said head for adjustable movement along said slot and adapted to be engaged and to be moved into a position by said rod indicating maximum movement of the rod, and a scale member on said head slidably adjustable along a line parallel to the line of movement of said slide and having a calibrated scale with which said slide cooperates.

4. In a device of the character described, a member having means for connecting the same to an engine cylinder, a rotatably adjustable head carried on said member, an operating rod carried by said member for universal movement relative thereto and having one end extending therebeyond so as to be engaged by a piston within the cylinder, means on the head cooperating with the other end of said rod for guiding said rod for swinging movement in a plane, an indicator slide mounted on said head for adjustable movement on a line parallel to the plane of movement of said rod and adapted to be engaged and to be moved into a position by said rod indicating maximum movement to the rod, and a scale member on said head slidably adjustable along a line parallel to the line of movement of said slide and having a calibrated scale with which said slide cooperates.

5. In a device of the character described, a member having means for connecting the same to an engine cylinder, a rotatably adjustable head carried by said member and having a slot, an operating rod having one end extending beyond said member so as to be engageable by a piston within the cylinder and having its other end extending through said slot, means between the ends of said rod for supporting the same for rotatable adjustment upon rotatable adjustment of said head and for pivotal movement in a plane lengthwise of said slot, an indicator slide mounted on said head for adjustable movement along said slot and adapted to be engaged and to be moved into a position by said rod indicating maximum movement of the rod, and a scale member on said head slidably adjustable along a line parallel to the line of movement of said slide and having a calibrated scale with which said slide cooperates.

6. In a device of the character described, a member having means for connecting the same to an engine cylinder, a rotatably adjustable head member carried by said first member, an indicator slide mounted on said head member for adjustment on a diametrical line of the head member, an operating member having one end extending beyond said first member so as to be engaged by a piston within the cylinder and having its other end engageable with said slide, means carried by one of said members for supporting said rod between its ends for rotatable adjustment upon rotatable adjustment of said head member and for pivotal movement in the line of movement of said indicator slide, and a scale member on said head member slidably adjusted on a line parallel to the line of movement of said slide and having a calibrated scale with which said slide cooperates.

7. In a device of the character described, a member having means for connecting the same to an engine cylinder, a rotatably adjustable head member carried by said first member and having a slot, an operating rod carried by one of said members for angular adjustment upon adjustment of said head member and for pivotal movement in a plane lengthwise of said slot, one end of said rod extending beyond said first member so as to be engaged by a piston within said cylinder and the other end of said rod extending through said slot, an indicator slide mounted on said head member for adjustment along said slot and adapted to be engaged and to be moved into a position by said rod indicating maximum movement of the rod, and a scale member on said head member slidably adjustable along a line parallel to the line of movement of said slide and having a calibrated scale with which said slide cooperates.

8. In a device of the character described, a member having means at one end for connecting the same to an engine cylinder, a head member mounted on the other end of said first member for rotatable adjustment in a plane generally at right angles to the length of said first member, said head member having a diametrically disposed slot, an operating rod having one end extending beyond the first mentioned end of said first member so as to be engaged by a piston within the cylinder, the other end of said rod extending through said slot, means carried by one of said members for supporting said rod between its ends for angular adjustment upon adjustment of said head member and for pivotal movement in a plane lengthwise of the slot, an indicator slide mounted on said head member for adjustable movement along said slot and adapted to be engaged and to be moved into a position by said rod indicating maximum movement of the rod, and a scale member on said head member slidably adjustable along a line parallel to the line of movement of said slide and having a calibrated scale with which said slide cooperates.

FRANCIS F. GRIFFITHS.

REFERENCES CITED

The following references are of record in the file of this patent:

UNITED STATES PATENTS

| Number | Name | Date |
|---|---|---|
| 490,725 | Smith | Jan. 31, 1893 |
| 942,497 | Harris | Dec. 7, 1909 |
| 1,421,501 | Kraft et al. | July 4, 1922 |
| 1,541,750 | Park | June 9, 1925 |
| 1,742,229 | Wood | Jan. 7, 1930 |
| 1,782,142 | Havens | Nov. 18, 1930 |
| 2,361,462 | Dickinson | Oct. 31, 1944 |
| 2,386,179 | Andrus | Oct. 9, 1945 |

FOREIGN PATENTS

| Number | Country | Date |
|---|---|---|
| 136,781 | Great Britain | Dec. 24, 1919 |